US010253895B2

(12) United States Patent
Yang et al.

(10) Patent No.: US 10,253,895 B2
(45) Date of Patent: Apr. 9, 2019

(54) CHECK VALVE FOR PREVENTING SLAM AND WATER HAMMER

(71) Applicants: Flowtech Co., Ltd., Incheon (KR); Ji Suk Yang, Incheon (KR); Jae Wook Oh, Incheon (KR)

(72) Inventors: Ji Suk Yang, Incheon (KR); Jae Wook Oh, Incheon (KR)

(73) Assignees: FLOWTECH CO., LTD., Incheon (KR); Ji Suk Yang, Incheon (KR); Jae Wook Oh, Incheon (KR)

( * ) Notice: Subject to any disclaimer, the term of this patent is extended or adjusted under 35 U.S.C. 154(b) by 0 days.

(21) Appl. No.: 15/528,107

(22) PCT Filed: Nov. 24, 2015

(86) PCT No.: PCT/KR2015/012621
§ 371 (c)(1),
(2) Date: May 19, 2017

(87) PCT Pub. No.: WO2016/093511
PCT Pub. Date: Jun. 16, 2016

(65) Prior Publication Data
US 2017/0328485 A1 Nov. 16, 2017

(30) Foreign Application Priority Data
Dec. 8, 2014 (KR) .................. 10-2014-0175290

(51) Int. Cl.
*F16K 15/03* (2006.01)
*F16K 31/12* (2006.01)
(Continued)

(52) U.S. Cl.
CPC .......... *F16K 15/035* (2013.01); *F16K 15/038* (2013.01); *F16K 31/12* (2013.01); *F16K 47/023* (2013.01); *F16K 47/045* (2013.01)

(58) Field of Classification Search
CPC ...... F16K 15/035; F16K 31/12; F16K 47/023; F16K 15/038; F16K 47/045
(Continued)

(56) References Cited

U.S. PATENT DOCUMENTS

| 4,693,269 A * | 9/1987 | Yamada | ................ F16K 15/033 |
|  |  |  | 137/484.2 |
| 5,746,246 A * | 5/1998 | Yokota | ................... F16K 15/033 |
|  |  |  | 137/514 |
| 6,543,474 B2 * | 4/2003 | Fetterman, Jr. | ......... F16K 15/03 |
|  |  |  | 122/14.31 |

FOREIGN PATENT DOCUMENTS

| CN | 1202229 | 12/1998 |
| CN | 202109038 | 1/2012 |

(Continued)

OTHER PUBLICATIONS

EPO, extended European search of EP 15866705.5 dated Jul. 23, 2018.
SIPO, office action of CN 201480078797.5 dated Apr. 16, 2018.

*Primary Examiner* — P. Macade Nichols
(74) *Attorney, Agent, or Firm* — Lex IP Meister, PLLC

(57) ABSTRACT

The present invention relates to a check valve and, more particularly, to a check valve comprising a main disk and a separate auxiliary disk, the main disk making a rapid closing operation, and the auxiliary disk, which has an area smaller than that of the main disk, making a slow closing operation, thereby reducing the velocity of a reverse flow inside a conduit, right before the disks are finally closed, and preventing a slam (a characteristic phenomenon wherein, when the disks are closed with a bang, an instantaneous increase in pressure wave raises the possibility of piping fracture and causes noise and vibration) of the disks and water hammer.

7 Claims, 13 Drawing Sheets

(51) Int. Cl.
 *F16K 47/02* (2006.01)
 *F16K 47/04* (2006.01)
(58) Field of Classification Search
 USPC .......................................................... 137/527
 See application file for complete search history.

(56) References Cited

FOREIGN PATENT DOCUMENTS

| | | |
|---|---:|---:|
| CN | 202252157 | 5/2012 |
| CN | 104204635 | 12/2014 |
| EP | 3147547 | 3/2017 |
| JP | 60-151473 | 8/1985 |
| JP | 61-094664 | 6/1986 |
| JP | 63-185967 | 11/1988 |
| JP | 08-135814 | 5/1996 |
| JP | 3487372 | 1/2004 |
| KR | 20-1987-0010460 | 7/1987 |
| KR | 20-0170011 | 11/1999 |
| KR | 10-0567927 | 4/2006 |
| KR | 10-2012-0081818 | 7/2012 |
| KR | 10-1487748 | 1/2015 |

\* cited by examiner (a)

(b)

(c)

(d)

CHECK VALVE FOR PREVENTING SLAM AND WATER HAMMER

TECHNICAL FIELD

The present invention relates generally to a check valve. More particularly, the present invention relates to a check valve, which includes a main disk and a separate auxiliary disk, the main disk making a rapid closing operation, and the auxiliary disk, which has an area smaller than that of the main disk, making a slow closing operation, thereby reducing the velocity of backflow inside a conduit, right before the disks are finally closed, and preventing valve slam (a characteristic phenomenon wherein, when the disks are closed with a bang, an instantaneous increase in a pressure wave raises the possibility of piping fracture and causes noise and vibration) of the disks and water hammer.

BACKGROUND ART

In general, when a pump is suddenly stopped or a valve closes suddenly in a water pipeline system, a transient condition in which an amount of flow and a hydraulic pressure are dramatically changed occurs. This phenomenon is referred to as water hammer or fluid hammer.

As a result of water hammer, pressure inside a pipe is dramatically increased or is decreased to be lower than a saturated vapor pressure such that vapor occurs, and after that, in the process of column separation and return, the pipe may be broken or damaged by a shock wave.

For example, as shown in FIG. 1, a water pipeline system includes: a water supply pump 2 supplying water from an inlet 1 to one direction; a main pipe P with the water being transferred therethrough; and an outlet 3 for discharging the water transferred from the main pipe P.

Further, the main pipe P may be provided not only with a check valve 4 for preventing back flow, but also with a flexible joint for preventing vibration and a shut-off valve for controlling the water flowing through the outlet 3.

Here, when the water supply pump 2 is stopped or the shut-off valve is quickly closed, velocity of flow is dramatically changed in the main pipe P between the inlet and the outlet 3, and thereby water hammer occurs, damaging the main pipe P or the water supply pump 2.

For the above reason, as shown in FIGS. 2 and 3, according to a document of related art, such as Korean Patent application publication No. 2013-0093299, a check valve is configured such that a shock-absorbing damper 50 is connected to a rotation shaft 20 of the disc 30, whereby in the case of quick closing of the valve, noise and vibration caused by a collision between a disc 30 and a valve body (for example, a valve seat surface), and water hammer caused by dramatic change in velocity of flow are prevented.

Thereby, as shown in FIG. 2a and FIG. 2b, even when the pump is stopped and the disc 30 moves down by weight of a balance weight 40, the disc 30 is slowly closed, that is, a slow closing function is provided by the shock-absorbing damper 50 constituted by a hydraulic cylinder, and the like.

However, as described above, when the slow closing function is applied, since the disk closing speed is slowed from the beginning of the disk closing, it not only allows a large amount of backflow but also increases the backflow time and also increases the backflow speed. Further, as the disk is accelerating as it closes, at the last moment the disk is closed, the backflow speed increases significantly, and more serious consequences than a quick-closing check valve may be caused due to the acceleration of the disk.

In other words, if it takes long for the disc 30 to move down to close a passage, during the time, a massive amount of fluid (namely, water) flows backward, and accordingly it is impossible for the check valve to perform its function. Moreover, the back flow may apply a pressure to the stopped water supply pump 2, or may cause a problem by making the water supply pump 2 rotate reversely.

Accordingly, when quick closing of a check valve is performed, noise, vibration, and water hammer occur. On the contrary, when slow closing is performed to solve this problem, the closer the disc is to being closed, the more force is exerted by the reverse flow, and at the end, the closing speed of the disc increases greatly, and the velocity of the backflow increases. When the velocity of the backflow increases, as can be seen from the following equation 1, variation of backflow velocity (ΔV) increases, and variation of head (ΔH) also increases, which leads to an instantaneous increase in pressure inside a conduit, whereby water hammer occurs.

$$\Delta H = (C/g) \Delta V \quad \text{(equation 1)}$$

(Herein, H: head, C: shock wave transmission rate according to pipe material characteristics, g: gravitational acceleration, V: backflow velocity)

Since water hammer cannot be sufficiently mitigated by the installation of the air chamber, the improvement of the check valve is required.

In particular, when the main pipe P is provided with an air chamber 3 to prevent water hammer, the air chamber 3 is expensive, and may accelerate the quick closing of the check valve by a hydraulic pressure caused when make-up water stored in the air chamber 3 is supplied to the main pipe P when the pump is suddenly stopped.

DISCLOSURE

Technical Problem

Accordingly, the present invention has been made keeping in mind the above problems occurring in the prior art, and an object of the present invention is to provide a check valve capable of reducing the amount of backflow when the check valve is closed, and preventing noise, vibration, and water hammer.

Technical Solution

In order to accomplish the above object, the present invention provides a check valve including: a valve body 110 including an inlet 111 and an outlet 112 provided respectively on a first side and a second side thereof, with a passage 113 being provided between the inlet 111 and the outlet 112; a main disk 130 opening or closing the passage 113 by being rotated inside the valve body 110, with a flow hole 132 being formed through a portion of the main disk; an auxiliary disk 136 opening or closing the flow hole 132 of the main disk 130 by being rotated inside the valve body 110; an auxiliary disk shaft 138 functioning as a rotating shaft of the auxiliary disk 136, and being rotatably provided inside the valve body 110, with a longitudinal end thereof extending outside the valve body 110; and a shock-absorbing damper 150 being connected to the auxiliary disk shaft 138, and slowly closing the auxiliary disk 136 by exerting a force in a direction opposite to a closing direction of the auxiliary disk 136.

Herein, the main disk 130 may be rotated about a main disc shaft 120 provided inside the valve body 110, or may be relative-rotatably coupled to the auxiliary disk shaft 138.

Herein, it is preferred that the main disk 130 is connected to the auxiliary disk shaft 138 via a main disk connection arm 122, wherein the main disk connection arm 122 is configured such that an end thereof is formed in an annular ring shape, and the auxiliary disk shaft 138 is fitted into the annular ring-shaped end of the main disk connection arm 122, whereby the main disk 130 is independently rotatable about the auxiliary disk shaft 138.

Further, it is preferred that the shock-absorbing damper 150 is connected to a rocker arm 153 protruding from an outer circumferential surface of the auxiliary disk shaft 138.

Meanwhile, it is preferred that the shock-absorbing damper 150 includes: a first shock-absorbing damper 150-1 that is provided on the valve body 110, and includes a first bumper 151-1 absorbing shock; a first shock-absorbing rod 152-1 connected to the first bumper 151-1 to transmit shock, and a first rocker arm 153-1 connected to the first shock-absorbing rod 152-1 at a first end thereof, and receiving torque from the auxiliary disk shaft 138 at a second end thereof; and a second shock-absorbing damper 150-2 that is provided on the valve body 110, and includes a second bumper 151-2 absorbing shock, a second shock-absorbing rod 152-2 connected to the second bumper 151-2 to transmit shock, and a second rocker arm 153-2 connected to the second shock-absorbing rod 152-2 at a first end thereof, and receiving torque from the auxiliary disk shaft 138 at a second end thereof, wherein a length of the second rocker arm 153-2 is relatively longer than a length of the first rocker arm 153-1 such that by a principle of a lever, a force transmitted to the second bumper 151-2 by the second rocker arm 153-2 is relatively smaller than a force transmitted to the first bumper 151-1 by the first rocker arm 153-1.

Further, it is preferred that the second rocker arm 153-2 is connected to the auxiliary disk shaft 138 at a location where the second rocker arm 153-2 is rotated higher than the first rocker arm 153-1.

Further, it is preferred that the auxiliary disk shaft 138 is connected to a support rod 114 via a connection bar 116, wherein the connection bar 116 is formed in a bar shape with a through hole provided at each end thereof, and the auxiliary disk shaft 138 and the support rod 114 are inserted through associated through holes, respectively.

Herein, it is preferred that a diameter of the through hole provided at an upper end of the connection bar 116 is larger than a diameter of the auxiliary disk shaft 138, and to prevent the connection bar 116 from being removed from the support rod 114, an end of the support rod 114 is provided with threads, and a nut 117 is engaged with the threaded end of the support rod 114 at a location outside the connection bar 116.

Advantageous Effects

The present invention configured as described above is advantageous in that it is provided with a main disk and a separate auxiliary disk, the main disk making a rapid closing operation, and the auxiliary disk, which has an area smaller than that of the main disk, making a slow closing operation, thereby not only reducing noise, vibration, and water hammer, but also reducing the amount of backflow.

DESCRIPTION OF DRAWINGS

FIG. 3b shows a side view of FIG. 3a;

FIG. 4b shows a side view of FIG. 4a;

FIG. 5b shows a side view of FIG. 5a;

Figure 1:
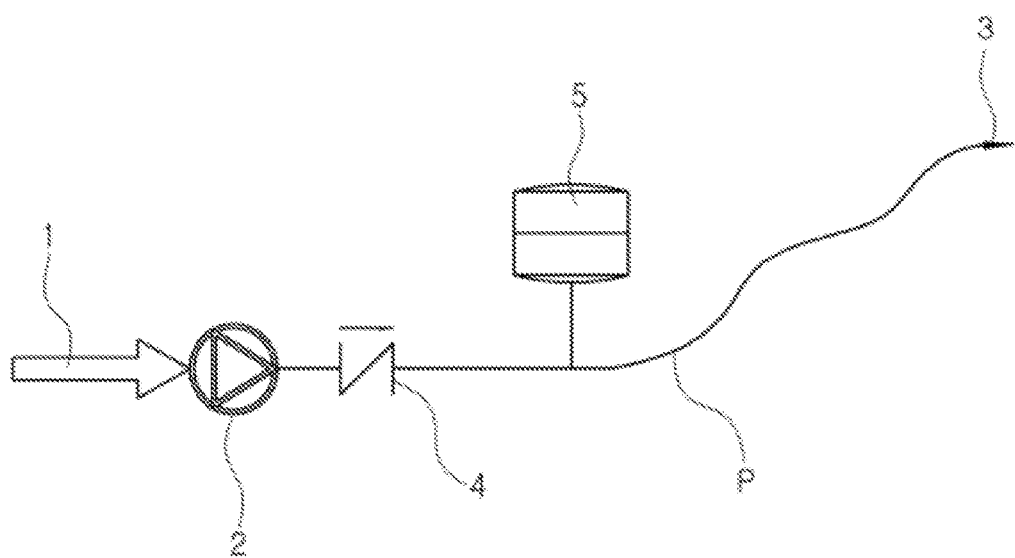
FIG. 1 shows a schematic diagram of a system of a conventional water pipeline.
Figure 2A:
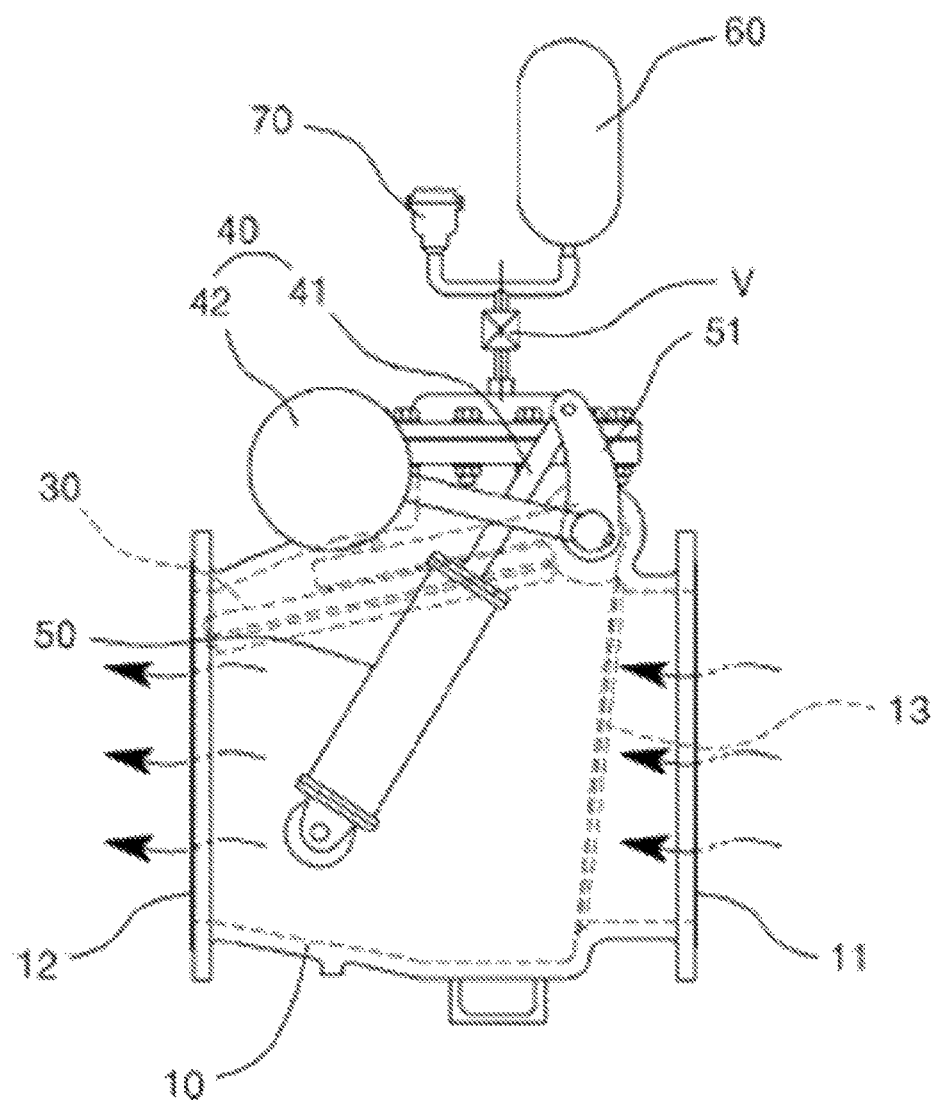
FIG. 2a shows a side view of a state where a check valve according to a conventional art is opened and FIG. 2b shows a side view of a state where the check valve according to the conventional art is closed.
Figure 2B:
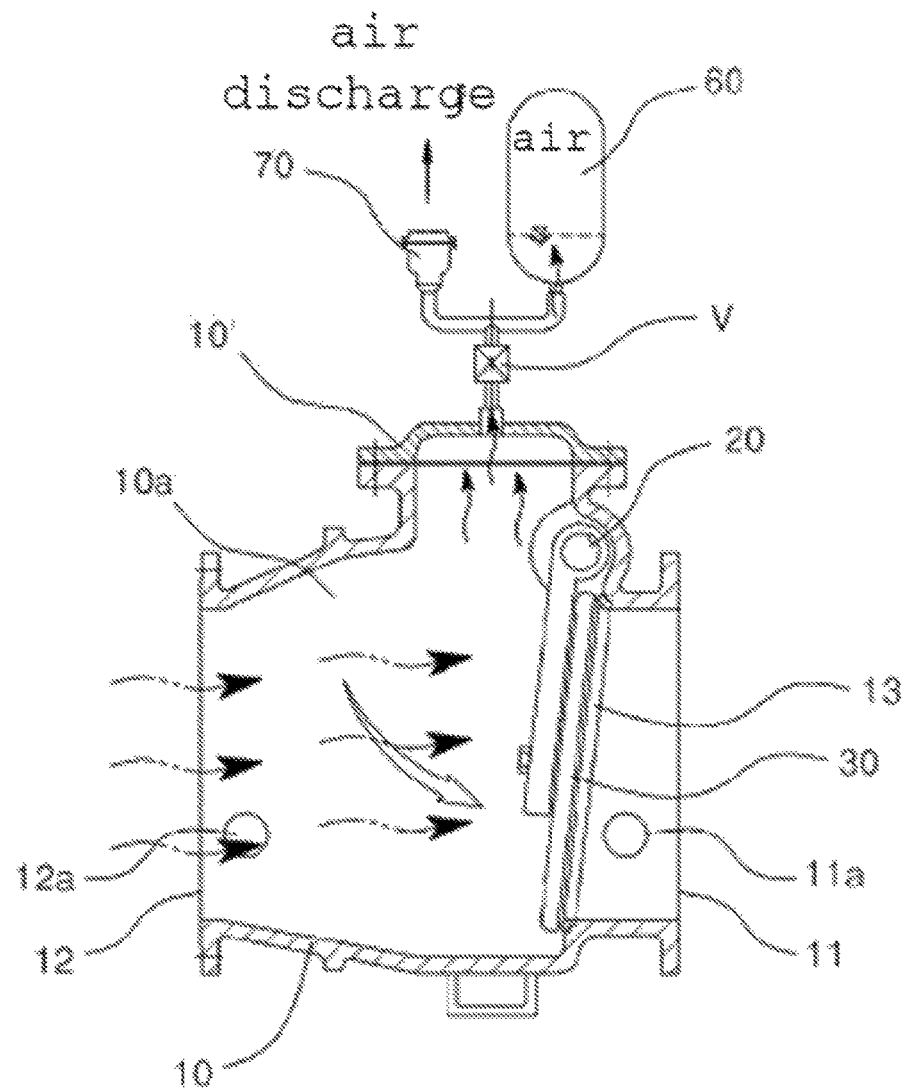

| [Description of reference characters of important parts] | |
|---|---|
| 110: valve body | 130: main disk |
| 132: flow hole | 136: auxiliary disk |
| 140: balance weight | 150-1, 150-2: shock-absorbing damper |

MODE FOR INVENTION

Hereinbelow, reference will now be made in greater detail to a check valve provided with an auxiliary disk for slow closing according to exemplary embodiments of the present invention, an example of which is illustrated in the accompanying drawings.

Figure 3A:
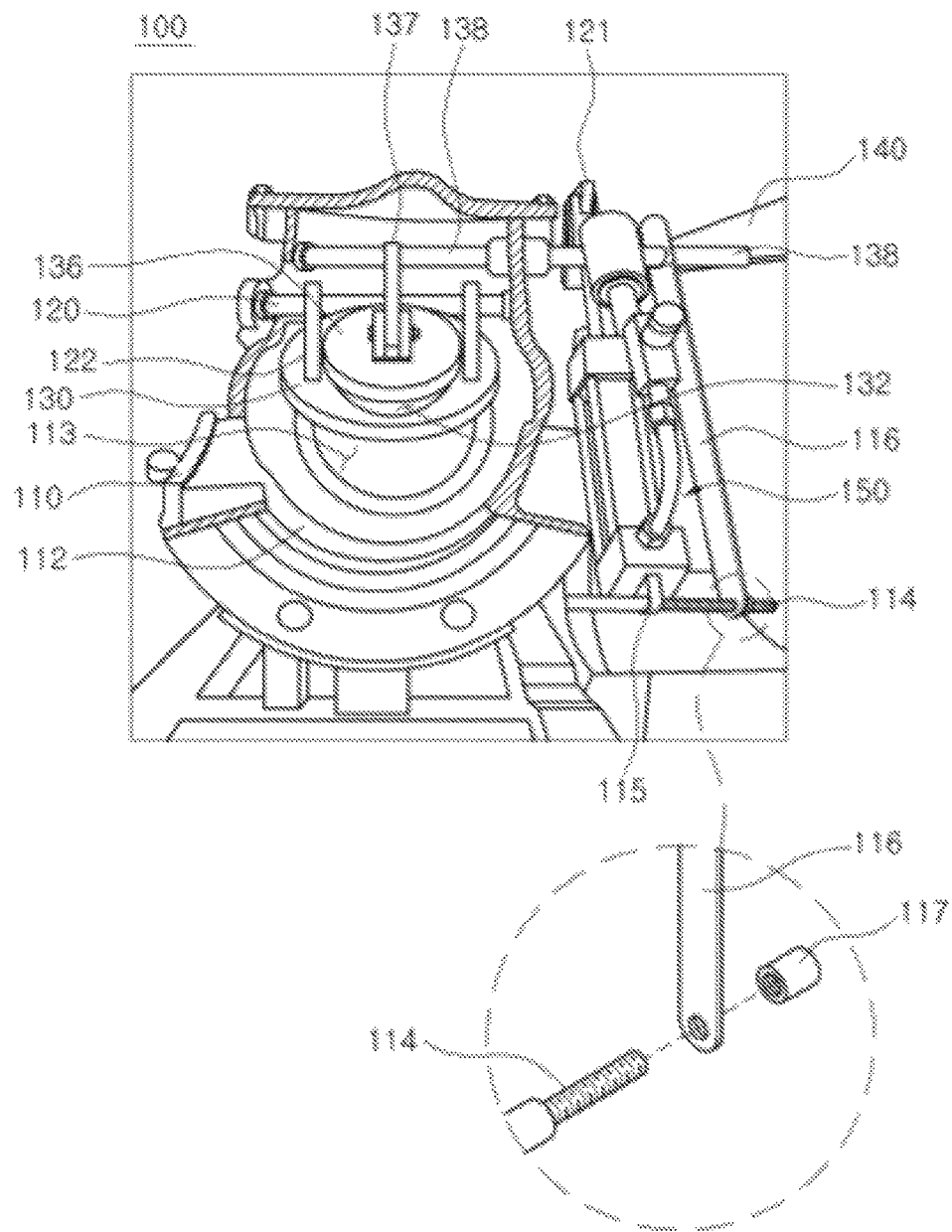
FIG. 3a shows a front view of a check valve according to a first embodiment of the present invention.
Figure 3B:
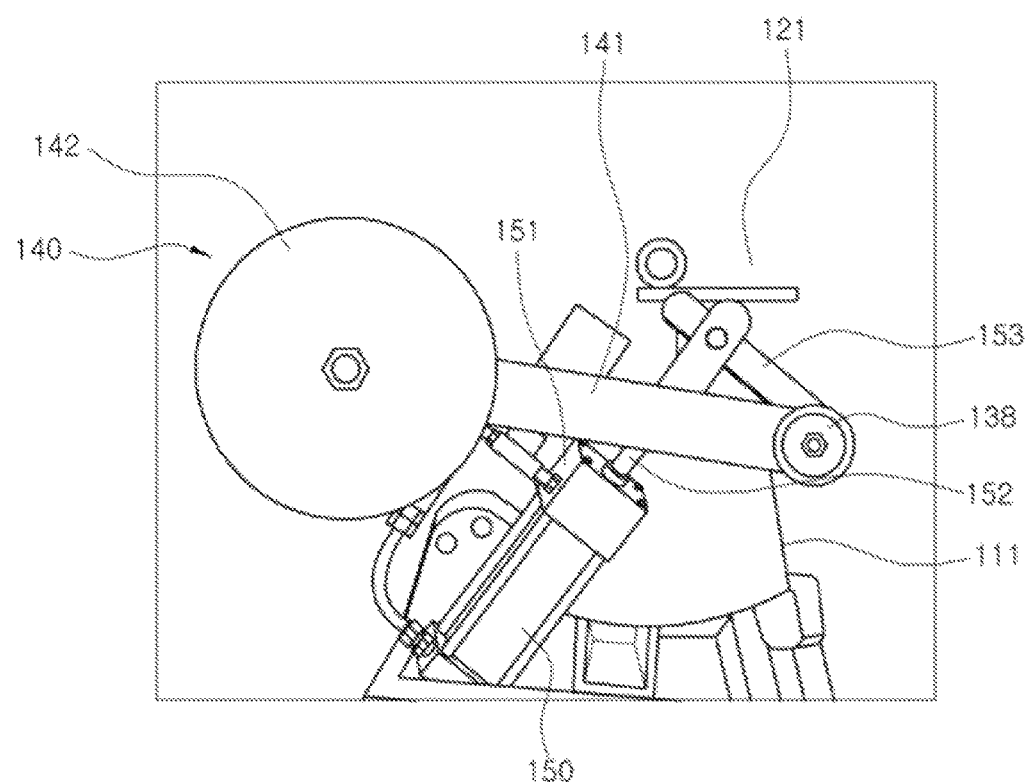

First of all, as shown in FIGS. 3a and 3b, a check valve according to the present invention includes: a valve body 110; a main disc shaft 120; a main disc 130; an auxiliary disk 136; an auxiliary disk shaft 138; a balance weight 140; and a shock-absorbing damper 150, wherein the main disk 130 is configured to be closed quickly, and on the contrary, the auxiliary disk 136 is configured to be closed slowly.

The valve body 110 is provided with an inlet 111 allowing a fluid to flow therein, and an outlet 112 allowing the fluid to be discharged therefrom, respectively at a front side and a back side thereof. The passage 113 is provided between the inlet 111 and the outlet 112. The inlet 111 and the outlet 112 are respectively connected to a water pipeline (see P in FIG. 1) so as to allow a fluid (that is, water) supplied through the water pipeline to flow through the inlet 111, the passage 113, and the outlet 112, wherein the check valve controls a flow of the fluid inside the water pipeline.

The main disk 130 serves to open or close the passage 113 by being rotated inside the valve body 110, and is rotated about the main disc shaft 120. Herein, the main disc shaft 120 is mounted at opposite inner side walls of the valve body 110 through, for example, a bearing. The main disc shaft 120 is mounted to an upper portion of the main disk 130 to be in parallel with the main disc, and is connected to the main disk 130 via a main disk connection arm 122. The main disk connection arm 122 is configured to be in a bar shape, and opposite ends thereof are fixedly coupled to the main disk 130 and the main disc shaft 120, respectively, by a method such as welding or a key. According to the above configuration, when the main disc shaft 120 is rotated, the main disk 120 is rotated, and the main disk 120 is opened by a fluid pressure increase in response to the operation of a pump and is closed by a fluid pressure decrease in response to the stopping of the pump, wherein the main disk 120 is closed quickly by the weight thereof and an outlet fluid pressure.

Meanwhile, it is preferred that a surface of the main disk 130 is provided with a flow hole 132 such that a predetermined amount of fluid flows in through the passage 113 for a predetermined time after the main disk 130 is completely closed, and the flow hole 132 is configured to be closed slowly by the auxiliary disk 136.

When the pump is stopped during operation, the supply of the fluid to the check valve is stopped, so the inlet pressure is decreased and the outlet pressure is increased, whereby the main disk 130 starts to be closed while being reversely rotated by the outlet pressure that is higher than the inlet pressure. As the rotational angle of the main disk 130 changes while closure progresses, the area of the main disk 130 that comes into contact with the fluid increases and the velocity of fluid backflow at the moment of the last closing increases, so the pressure applied to the main disk 130 increases, and the main disk 130 is further more quickly closed. Thereby, the main disk 130 exerts strong shock on a valve seat (a slam phenomenon wherein a valve is slammed shut), resulting in vibration, noise and water hammer.

Accordingly, the present invention is configured such that a flow hole 132 is formed through a portion of a surface of the main disk 130 to reduce noise and vibration when the main disk is closed by reducing the pressure applied to the main disk 130 through reducing the area of the main disk 130 that comes into contact with the fluid when it is closed. In other words, when the pump is stopped, the outlet fluid presses the main disk 130 to be rotated and closed. Here, since some of the fluid flows out through the flow hole 132, the pressure applied to the main disk 130 is reduced, whereby even when the main disk 130 is quickly closed, it is possible to reduce shock exerted on the valve seat, and since the weight of the main disc 130 is reduced by the flow hole 132, the shock reduction effect becomes larger.

Further, in a conventional check valve in which the main disk 130 is closed slowly, since the time taken for the main disk 130 to be completely closed is long, the amount of backflow is very large, but according to the configuration of the present invention, since the main disk 130 is quickly closed, it is possible to reduce the amount of backflow. Although some backflow occurs through the flow hole 132, the amount thereof is small, and the entire amount of the backflow is significantly reduced. As described above, the area of the flow hole 132 may be appropriately selected in order to reduce the shock when the main disk 130 is quickly closed while minimizing the amount of backflow through the flow hole 132.

Meanwhile, to prevent backflow, a unique function of check valves, the flow hole 132 should be closed completely, so the check valve according to the present invention further includes the auxiliary disk 136 that closes the flow hole 132 of the main disk 130, and the auxiliary disk 136 is closed (slowly) later than the main disk 130. The auxiliary disk 136 is configured similar to the main disk 130, to open or close the flow hole 132 by a rotation thereof, and to achieve this, an upper portion of the auxiliary disk 136 is provided with the auxiliary disk shaft 138. The auxiliary disk shaft 138 is rotatably mounted inside the valve body 110 (more specifically, to an upper portion of the main disc shaft 120) via, for example, a bearing, and a longitudinal end thereof extends outside the valve body 110. Further, the auxiliary disk 136 and the auxiliary disk shaft 138 are coupled to each other via an auxiliary disk connection arm 137.

The balance weight 140 rotates about the auxiliary disk shaft 138 by being connected to auxiliary disk shaft 138 outside the valve body 110, and thereby serves to rotate the auxiliary disk 136 so as to open and close the flow hole 132 of the main disk 130.

To achieve this, the balance weight 140 includes: a rotation rod 141 for connection with the auxiliary disk shaft 138; and a weight member 142 having a predetermined weight, wherein a length of the rotation rod 141 and a weight of the weight member 142 may be determined according to the valve capacity, or the like.

The shock-absorbing damper 150 is configured to exert a force in a direction opposite to a closing direction of the auxiliary disk 136, more specifically, in a direction opposite to a direction where the weight of the balance weight 140 is applied, when the auxiliary disk 136 is moved down, such that the balance weight 140 is moved down slowly to allow the auxiliary disk 136 to be closed slowly. As shown in FIGS. 3a and 3b, it is preferred that the shock-absorbing damper is in the form of a hydraulic or a pneumatic cylinder. Herein, an end of a shock-absorbing rod 152 of the shock-absorbing damper 150 is connected to a rocker arm 153 protruding from an outer circumferential surface of the auxiliary disk shaft 138. Thereby, when the balance weight 140 is moved down and the auxiliary disk shaft 138 is rotated, the shock-absorbing rod 152 connected to the rocker arm 153 contracts to buffer and delay the rotation of the auxiliary disk shaft 138, and thus, slow closing of the auxiliary disk 136 is realized.

Herein, as shown in FIG. 3a, it is preferred that a lower portion of the shock-absorbing damper 150 is rotatably hinged to a support rod 114 protruding from a lower outer side of the valve body 110. Thereby, smooth rotation of the rocker arm 153 connected to the auxiliary disk shaft 138 is possible. More specifically, the lower portion of the shock-absorbing damper 150 is formed with a hinge block 115 with a hinge hole formed therethrough horizontally, wherein the support rod 114 is inserted through the hinge hole.

Further, it is preferred that the auxiliary disk shaft 138 and the support rod 114 are connected to each other via a connection bar 116. The auxiliary disk shaft 138 may be deflected or twisted because it receives a large load while the auxiliary disk is rotated due to the pressure of fluid and a large load due to the load during rotation of the balance weight 140. Further, the support rod 114 may also sag or bend due to the load of the shock-absorbing damper 150. Accordingly, when the auxiliary disk shaft 138 and the support rod 114 are connected to each other via the connection bar 116, it is possible to prevent bend of the auxiliary disk shaft 138 and the support rod 114. To achieve this, the connection bar 116 is formed in a bar shape extending in a longitudinal direction thereof with a through hole provided at each end thereof, and the auxiliary disk shaft 138 and the support rod 114 are inserted through associated through holes, respectively. Here, it is preferred that a diameter of the through hole provided at an upper end of the connection bar 116 is larger than a diameter of the auxiliary disk shaft 138, so as not to interfere with the rotation of the auxiliary disk shaft 138. Further, it is preferred that an end of the support rod 114 is provided with threads, and a nut 117 is engaged with the threaded end of the support rod 114 at a location outside the connection bar 116, thereby preventing the connection bar 116 from being removed from the support rod 114.

Figure 3C:
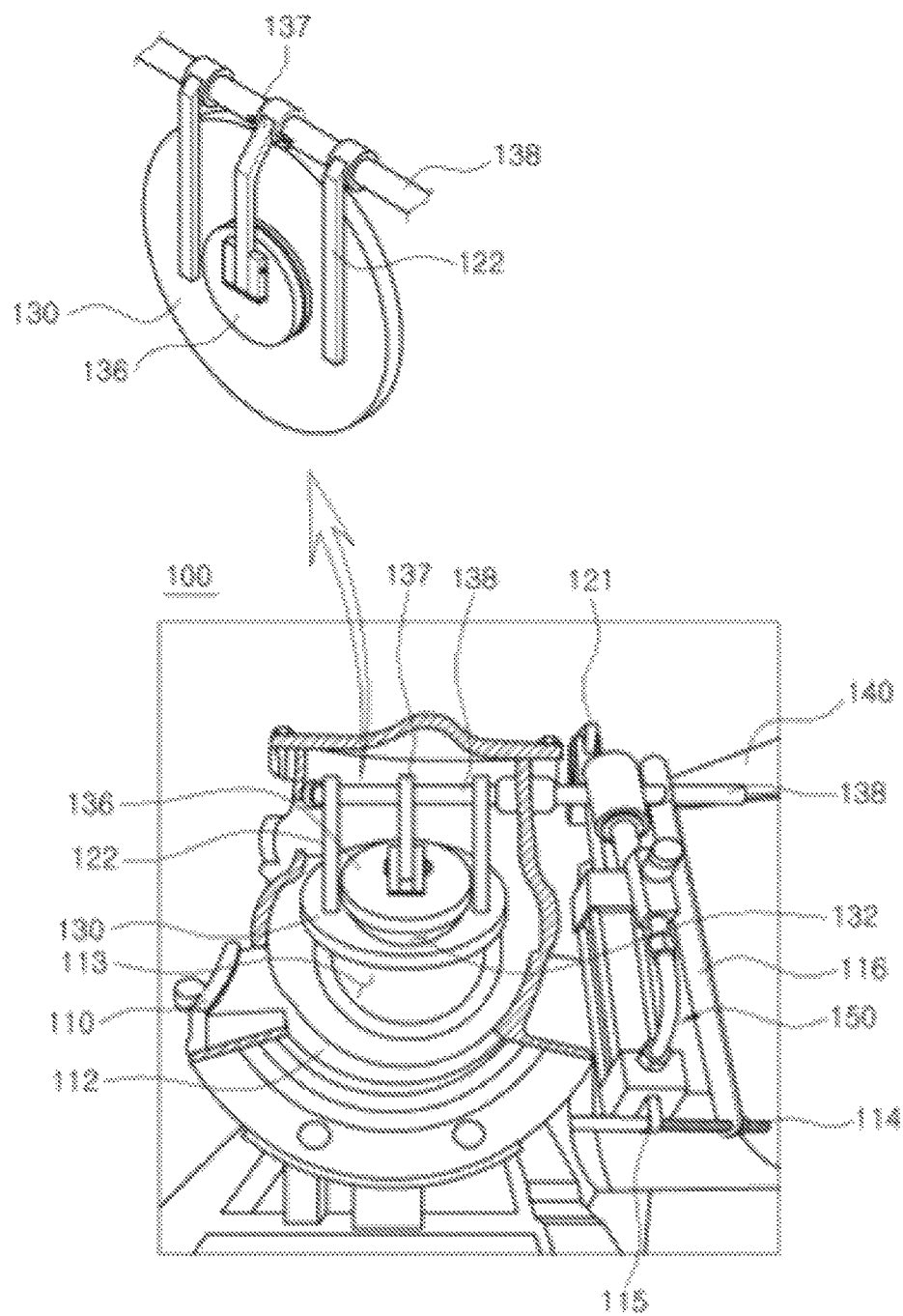
FIG. 3c shows a front view of a check valve according to a second embodiment of the present invention.
Figure 4A:
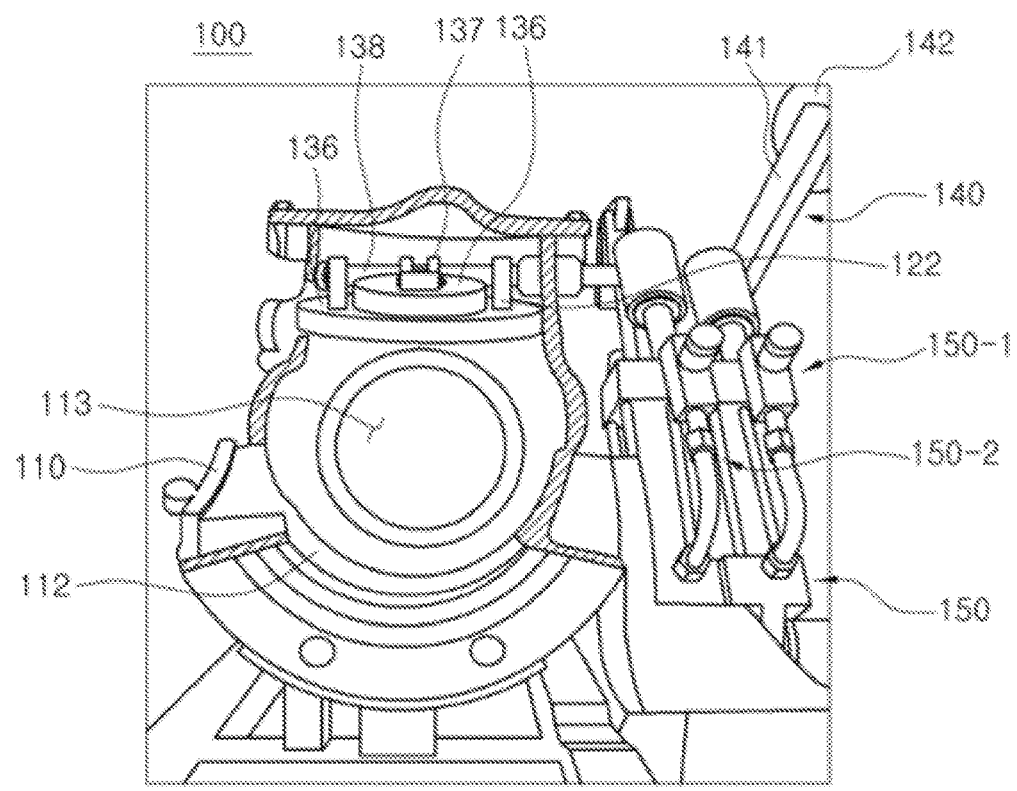
FIG. 4a shows a front view of a check valve (in an opened state) according to a third embodiment of the present invention.
Figure 4B:
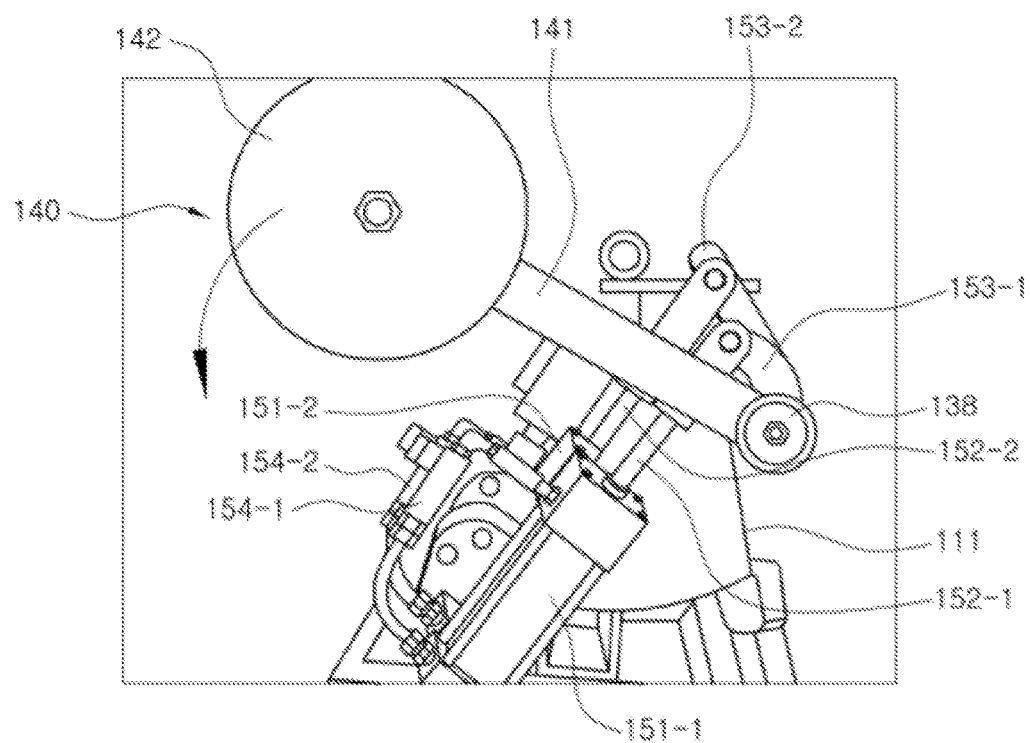
Figure 5A:
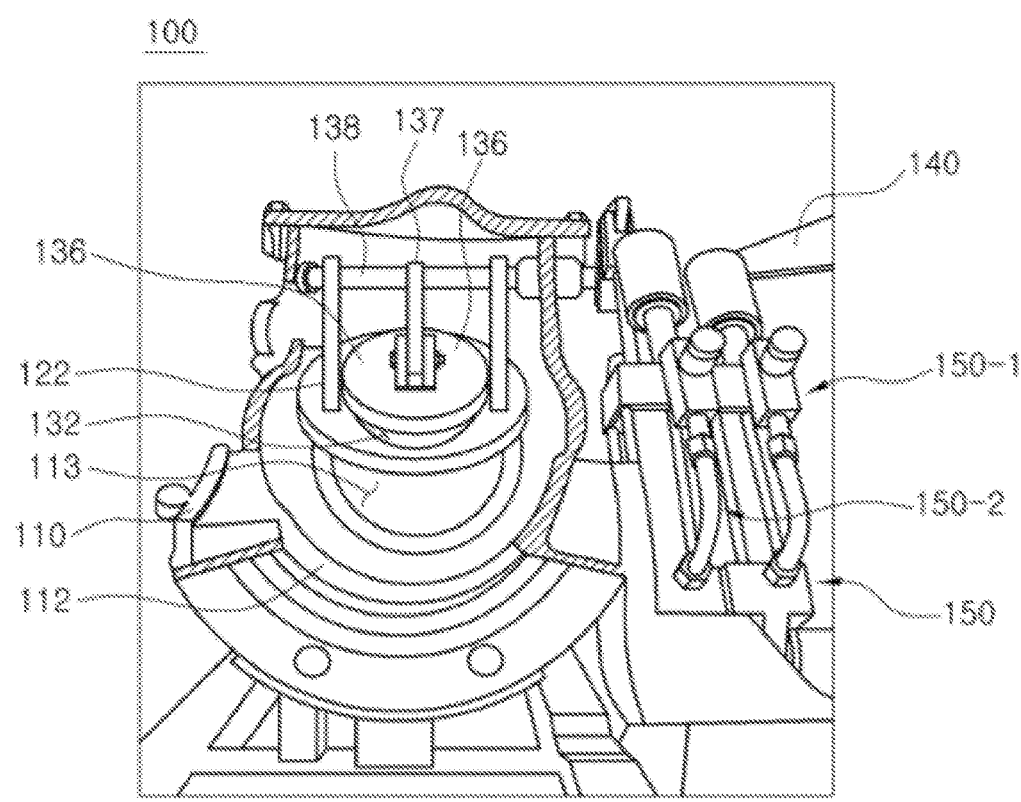
FIG. 5a shows a front view of the check valve (in a closed state) according to the third embodiment of the present invention.
Figure 5B:
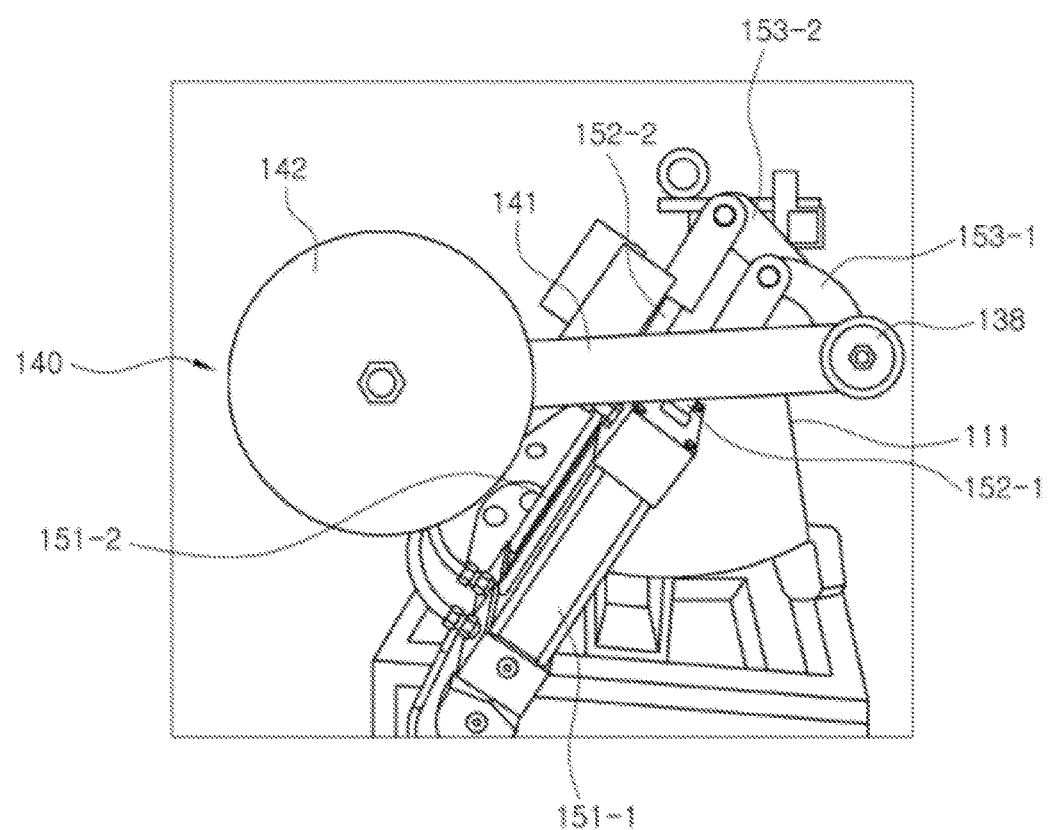

Meanwhile, in the above description, the main disk 130 is rotatably coupled to the separate main disc shaft 120, but according to another embodiment of the present invention, without the separate main disc shaft 120, the main disk can be relative-rotatably coupled to the auxiliary disk shaft 138. Specifically, as shown in FIG. 3c, an end of the auxiliary disk connection arm 137 may be welded on an outer circumferential surface of the auxiliary disk shaft 138, or may be formed in an annular ring shape such that after the auxiliary disk shaft 138 is inserted thereinto, and is fixedly coupled by a key, whereby the auxiliary disk shaft 138 is rotated along with the auxiliary disk 136. On the contrary, the main disk connection arm 122 is configured such that an end thereof is formed in an annular ring shape, and the auxiliary disk shaft 138 is fitted into the annular ring-shaped end without using a key, whereby the main disk 130 is independently rotatable. Accordingly, the main disk 130 is rotated independently of the rotation of the auxiliary disk shaft 138 and can make a quick closing operating without being affected by the shock-absorbing damper 150.

According to a further embodiment of the present invention, as shown in FIGS. 4a, 4b, 5a, and 5b, the shock-absorbing dampers 150 includes a first shock-absorbing damper 150-1 and a second shock-absorbing damper 150-2 which are disposed in parallel to each other. The shock-absorbing damper 150 may be in the form of a single cylinder, but as in the embodiment, the case where two cylinders are disposed in parallel to each other allows precise control of the speed of opening and closing the auxiliary disk 136.

The parallel-type shock-absorbing damper 150 according to the present invention includes the first shock-absorbing damper 150-1 and the second shock-absorbing damper 150-2, wherein the first shock-absorbing damper 150-1 and the second shock-absorbing damper 150-2 are connected to the auxiliary disk shaft 138 extending outside the valve body 110.

Figure 6:
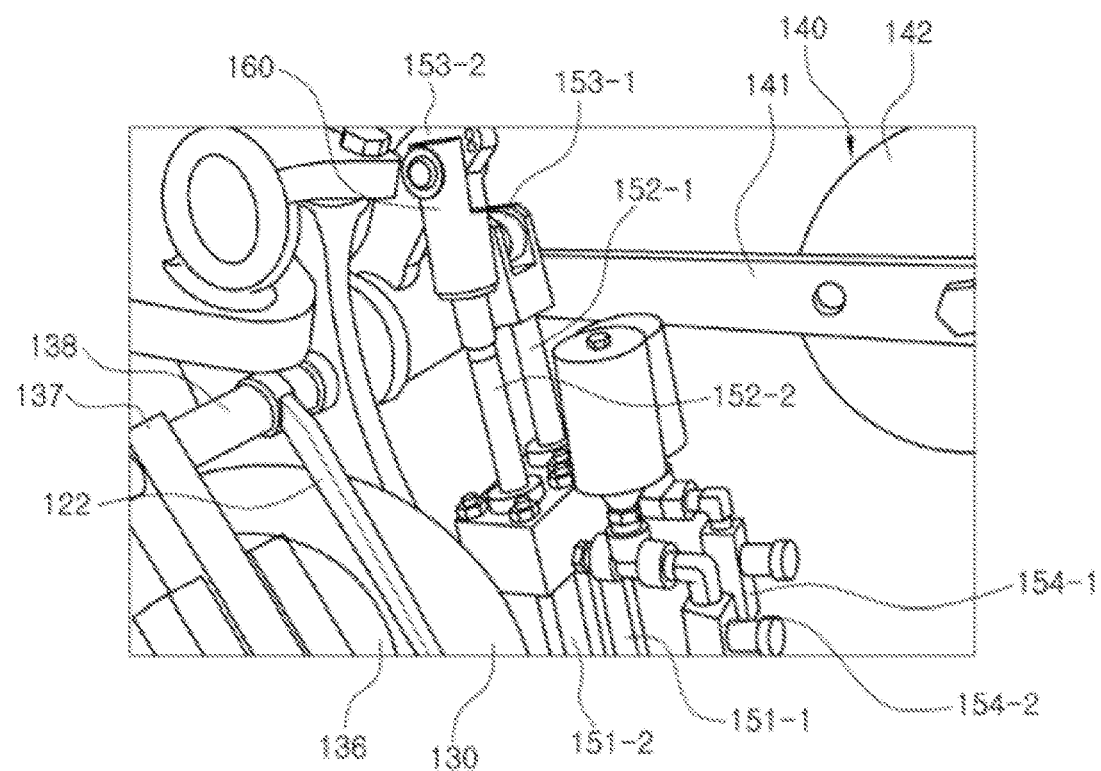
FIG. 6 shows a partial perspective view of the check valve according to the third embodiment of the present invention.

As shown in FIG. 6, of the two shock-absorbing dampers 150 connected in parallel to each other, the first shock-absorbing damper 150-1 includes a first bumper 151-1, a first shock-absorbing rod 152-1, and a first rocker arm 153-1. The second shock-absorbing damper 150-2 includes a second bumper 151-2, a second shock-absorbing rod 152-2, and a second rocker arm 153-2.

The first bumper 151-1 and the second bumper 151-2 serve to provide buffer power, and the first shock-absorbing rod 152-1 and the second shock-absorbing rod 152-2 are connected respectively to the first bumper 151-1 and the second bumper 151-2 so as to transmit torque of the auxiliary disk shaft 138 thereto.

Herein, the first shock-absorbing damper 150-1 may be in the form of a hydraulic or a pneumatic cylinder device. In this case, the first bumper 151-1 is a cylinder; and the first shock-absorbing rod 152-1 is a cylinder rod connected to the cylinder.

Further, in the case where a cylinder device is used as the first shock-absorbing damper 150, a first pressure regulating valve 154-1 is generally provided in the damper. The pressure regulating valve 154-1 is also referred as an 'oil (air) flow control valve', and serves to regulate internal pressure of the cylinder caused by oil (air) pressure inside the cylinder.

In the first shock-absorbing damper 150-1, the first bumper 151-1 is locked outside the valve body 110. For example, the first bumper may be locked to the support rod 114 that is provided at a lower portion outside the valve body 110. Of course, the first bumper may be locked to a bottom.

The first shock-absorbing rod 152-1 performs a linear reciprocating motion in which the first shock-absorbing rod moves to the inside of a body of the first bumper 151-1 or moves from the inside of the body of the first bumper 151-1 to the outside thereof. Here, since hydraulic pressure or pneumatic pressure is applied to the first shock-absorbing rod 152-1, it is possible to allow the balance weight 140 to move slowly by a buffering effect. Thereby, it is possible to allow slow closing of the auxiliary disk 136.

The first rocker arm 153-1 is configured such that a first end thereof is connected to the first shock-absorbing rod 152-1, and a second end thereof is locked to the auxiliary disk shaft 138.

Similar to the first shock-absorbing damper, the second bumper 151-2 of the second shock-absorbing damper 150-2 may be in the form of a hydraulic or a pneumatic cylinder, and is locked outside the valve body 110. For example, second bumper 151-2 may be provided next to the first bumper 151-1 so as to be in parallel to each other. Further, the second bumper 151-2 is provided with a pressure regulating valve 154-2.

The second shock-absorbing rod 152-2 performs a linear reciprocating motion in which the second shock-absorbing rod moves to the inside of a body of the second bumper 151-2 or moves from the inside of the body of the second bumper 151-2 to the outside thereof, and allows the auxiliary disk 136 to be closed slowly in cooperation with the first shock-absorbing rod 152-1.

The second rocker arm 153-2 is configured such that a first end thereof is connected to the second shock-absorbing rod 152-2, and a second end thereof is locked to the auxiliary disk shaft 138. In the case where the first bumper 151-1 and the second bumper 151-2 are disposed in parallel to each other, the second rocker arm 153-2 is disposed next to the first rocker arm 153-1 so as to be parallel to each other.

In particular, in the present invention, the second rocker arm 153-2 of the second shock-absorbing damper 150-2 is longer than the first rocker arm 153-1 of the first shock-absorbing damper 150-1. This is because by using two shock-absorbing dampers 150 and by using the principle of a lever, it is possible to produce an effect of using more than two shock-absorbing dampers 150.

For example, assuming that a length of the second rocker arm 153-2 is 10, and a length of the first rocker arm 153-1 is 5 to have ratio of 2:1 therebetween, a force applied to the second shock-absorbing rod 152-2 by the second rocker arm 153-2 is 5, and a force applied to the first shock-absorbing rod 152-1 by the first rocker arm 153-1 is 10. In other words, the exerting force and the length are inversely related.

The auxiliary disk shaft 138 corresponds to a fulcrum, and each of the first rocker arm 153-1 and the second rocker arm 153-2 locked to the auxiliary disk shaft 138 serves as a lever. Therefore, when the second rocker arm 153-2 is configured to be longer than the first rocker arm 153-1, a force applied by the first rocker arm 153-1 is larger than that applied by the second rocker arm 153-2 when the auxiliary disk shaft 138 rotates.

In other words, the force applied to the second shock-absorbing rod 152-2 by the second rocker arm 153-2 is relatively smaller than the force applied to the first shock-absorbing rod 152-1 by the first rocker arm 153-1.

Accordingly, even if two cylinders on the market are used, a force transmitted to the second bumper 151-2 through the second rocker arm 153-2 by the balance weight 140 is small, so the disc is closed slowly while overcoming the pressure of the second bumper 151-2. As described above, the present invention provides effect of slow closing of the auxiliary disk 136, which is more than that produced by simply using two cylinders.

However, as shown in the drawings, it is preferred that the second rocker arm 153-2 having a length longer than the first rocker arm 153-1 is connected to the auxiliary disk shaft 138 at a location where the second rocker arm is rotated higher than the first rocker arm.

Figure 7:
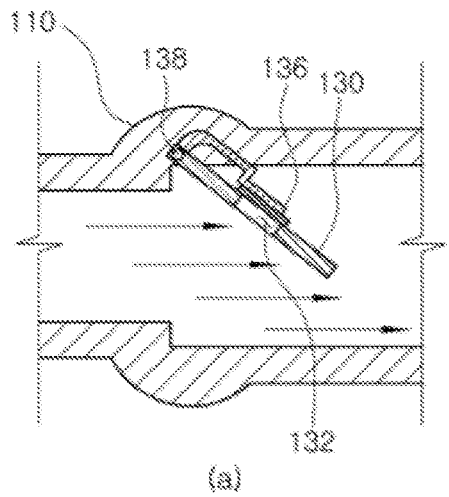
FIG. 7 shows operational views of the check valve according to the present invention.
Figure 7:
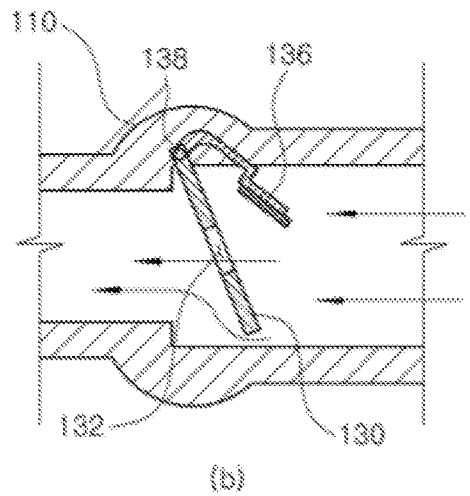
Figure 7:
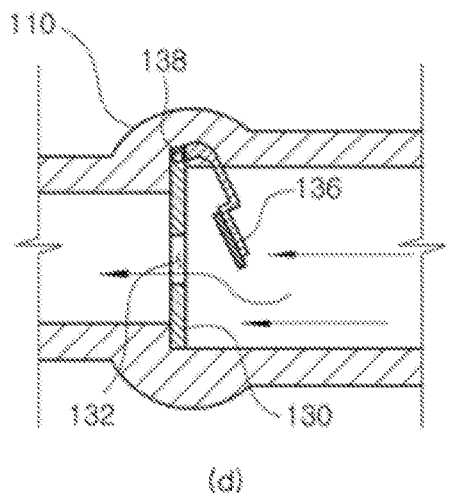
Figure 7:
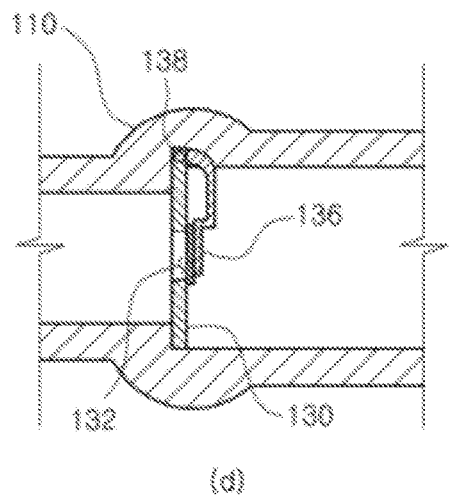

FIG. 7 schematically shows operational views of the check valve configured as described above. As shown in FIG. 7a, when the pump is initially operated and the fluid flows in the forward direction, both the main disk 130 and the auxiliary disk 136 are opened.

When the fluid is not supplied due to the sudden stop of the pump, as shown in FIG. 7b, the main disk 130 is closed at a relatively raid speed to minimize the amount of backflow, and the auxiliary disk 136 is closed relatively slowly to reduce the increase in the backflow velocity and shock caused by quick closing of the main disk 130. In this case, a small amount of the fluid flows back through the flow hole 132, thereby reducing the pressure applied to the main disk 130, so it is possible to prevent a slam due to quick closing of the valve.

FIG. 7c shows a state where the main disk 130 is completely closed and the auxiliary disk 136 is being closed slowly; and FIG. 7d shows a state where both the main disk 130 and the auxiliary disk 136 are completely closed.

Figure 8:
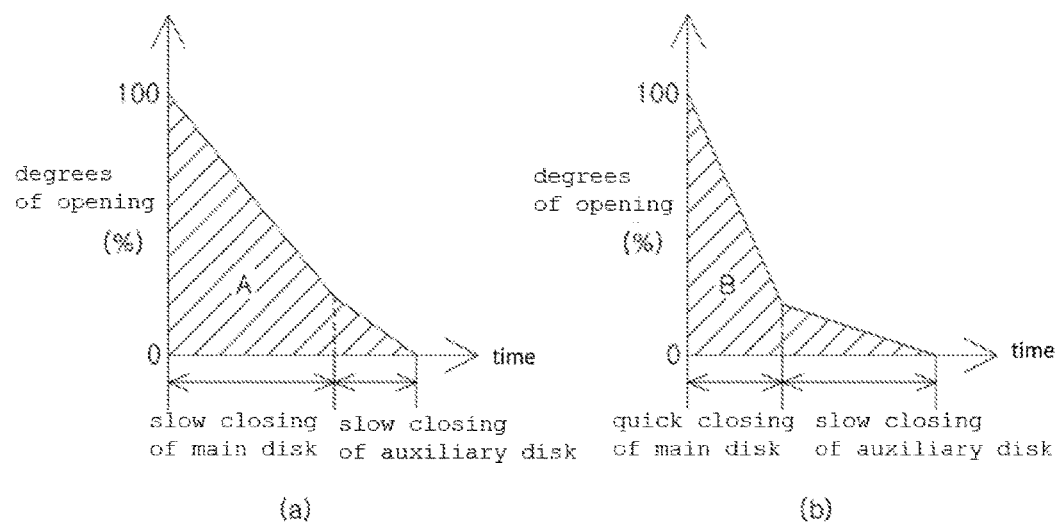
FIG. 8 shows a graph (a) of changes in degrees of opening over time in a conventional check valve, in which a main disk and an auxiliary disk are closed slowly, and a graph (b) of changes in degrees of opening over time in the check valve provided with an auxiliary disk for slow closing according to the present invention.

Meanwhile, FIG. 8 shows a graph (a) of changes in degrees of opening over time in a conventional check valve, in which a main disk and an auxiliary disk are closed slowly (the case of providing a shock-absorbing damper, such as a cylinder, to each of the main disk and the auxiliary disk), and a graph (b) of changes in degrees of opening over time in the check valve provided with an auxiliary disk for slow closing according to the present invention. As shown in FIG. 8a, the check valve, in which the main disk and the auxiliary disk are closed slowly, is closed slowly in a nearly constant speed over time, so the slope of the graph is moderate, and in the graph, the area A formed by crossing the time axis (X axis) and the opening axis (Y axis) is relatively large. Herein, the large area A means that the valve is open for a long period of time, which means that the amount of backflow is large and the backflow velocity is also greatly increased.

On the contrary, in the case of the check valve according to the present invention, since the main disk 130 is closed quickly, and the auxiliary disk 136 is closed slowly, the graph is derived as shown in FIG. 8b, and in the graph, the area B formed by crossing the time axis (X axis) and the opening axis (Y axis) is relatively considerably smaller than the area A. In other words, in the case of the check valve according to the present invention, the amount of backflow is considerably reduced compared with the conventional check valve, in which the main disk and the auxiliary disk are closed slowly.

As described above, according to the check valve of the present invention, the main disk 130 is closed quickly to minimize the amount of backflow, and the auxiliary disk 136 is closed slowly to prevent noise, vibration, and water hammer due to shock caused when the valve is closed, whereby it is possible to compensate for disadvantages of all of the conventional quick-closing check valve, the slow-closing check valve, and the check valve, in which a main disk and an auxiliary disk are closed slowly.

As described above, although reference to the embodiments has allowed the present invention to be described in more detail, it should be understood that the present invention is not limited to the embodiments but may be variously changed without departing from the technical idea of the present invention.

Therefore, the embodiments disclosed in the present invention are not restrictive but are illustrative, and the scope of the technical idea of the present invention is not limited to the embodiments. The scope of the present invention should be interpreted by the accompanying claims, and it is to be understood that all technical ideas within the claims fall within the purview of the present invention.

The invention claimed is:

1. A check valve comprising:
   a valve body (110) including an inlet (111) and an outlet (112) provided respectively on a first side and a second side thereof, with a passage (113) being provided between the inlet (111) and the outlet (112);
   a main disk (130) opening or closing the passage (113) by being rotated inside the valve body (110), with a flow hole (132) being formed through a portion of the main disk;
   an auxiliary disk (136) opening or closing the flow hole (132) of the main disk (130) by being rotated inside the valve body (110);
   an auxiliary disk shaft (138) functioning as a rotating shaft of the auxiliary disk (136), and being rotatably provided inside the valve body (110), with a longitudinal end thereof extending outside the valve body (110); and
   a shock-absorbing damper (150) being connected to the auxiliary disk shaft (138), and slowly closing the auxiliary disk (136) by exerting a force in a direction opposite to a closing direction of the auxiliary disk (136), wherein
   the shock-absorbing damper (150) includes:
   a first shock-absorbing damper (150-1) provided on the valve body (110), and including: a first bumper (151-1) absorbing shock; a first shock-absorbing rod (152-1) connected to the first bumper (151-1) to transmit shock; and a first rocker arm (153-1) connected to the first shock-absorbing rod (152-1) at a first end thereof, and receiving torque from the auxiliary disk shaft (138) at a second end thereof; and
   a second shock-absorbing damper (150-2) provided on the valve body (110), and including: a second bumper (151-2) absorbing shock; a second shock-absorbing rod (152-2) connected to the second bumper (151-2) to transmit shock; and a second rocker arm (153-2) connected to the second shock-absorbing rod (152-2) at a first end thereof, and receiving torque from the auxiliary disk shaft (138) at a second end thereof, wherein
   a length of the second rocker arm (153-2) is relatively longer than a length of the first rocker arm (153-1) such that a force transmitted to the second bumper (151-2) by the second rocker arm (153-2) is relatively smaller than a force transmitted to the first bumper (151-1) by the first rocker arm (153-1).

2. The check valve of claim 1, wherein the main disk (130) is rotated about a main disc shaft (120) provided inside the valve body (110).

3. The check valve of claim 1, wherein
the main disk (130) is relative-rotatably coupled to the auxiliary disk shaft (138).

4. The check valve of claim 3, wherein
the main disk (130) is connected to the auxiliary disk shaft (138) via a main disk connection arm (122), wherein
the main disk connection arm (122) is configured such that an end thereof is formed in an annular ring shape, and the auxiliary disk shaft (138) is fitted into the annular ring-shaped end of the main disk connection arm (122), whereby the main disk (130) is independently rotatable about the auxiliary disk shaft (138).

5. The check valve of any one of claim 1, wherein
the second rocker arm (153-2) is connected to the auxiliary disk shaft (138) at a location where the second rocker arm (153-2) is rotated higher than the first rocker arm (153-1).

6. The check valve of any one of claim 1, wherein the auxiliary disk shaft (138) is connected to a support rod (114) via a connection bar (116), wherein
the support rod (114) protrudes from a lower outer side of the valve body (110),
the connection bar (116) is formed in a bar shape with a through hole provided at each end thereof, and
the auxiliary disk shaft (138) and the support rod (114) are inserted through associated through holes, respectively.

7. The check valve of claim 6, wherein
a diameter of the through hole provided at an upper end of the connection bar (116) is larger than a diameter of the auxiliary disk shaft (138), and
an end of the support rod (114) is provided with threads, and a nut (117) is engaged with the threaded end of the support rod (114) at a location outside the connection bar (116), thereby preventing the connection bar (116) from being removed from the support rod (114).

\* \* \* \* \*